United States Patent
Hollaar et al.

(10) Patent No.: US 7,028,044 B2
(45) Date of Patent: Apr. 11, 2006

(54) HIGHLIGHTING QUOTED PASSAGES IN A HYPERTEXT SYSTEM

(75) Inventors: Lee A. Hollaar, Salt Lake City, UT (US); Jeffrey A. Lorenzen, Park City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 368 days.

(21) Appl. No.: 09/909,519

(22) Filed: Jul. 20, 2001

(65) Prior Publication Data

US 2002/0089533 A1 Jul. 11, 2002

Related U.S. Application Data

(63) Continuation-in-part of application No. 08/363,772, filed on Dec. 22, 1994, now abandoned.

(51) Int. Cl.
*G06F 17/30* (2006.01)

(52) U.S. Cl. ............... 707/102; 707/100; 707/101; 707/103 R; 707/104.1; 709/217; 709/218; 715/500; 715/501; 715/513

(58) Field of Classification Search ............ 707/100, 707/101, 102, 103 R, 104.1, 10; 715/500, 715/501, 513; 709/218
See application file for complete search history.

(56) References Cited

U.S. PATENT DOCUMENTS

| | | | |
|---|---|---|---|
| 5,297,249 A | 3/1994 | Bernstein et al. | 395/156 |
| 5,367,621 A | 11/1994 | Cohen et al. | 395/154 |
| 5,388,196 A | 2/1995 | Pajak et al. | 395/153 |
| 5,495,581 A * | 2/1996 | Tsai | 715/526 |
| 5,526,520 A * | 6/1996 | Krause | 707/104.1 |
| 5,680,613 A * | 10/1997 | Atsumi | 707/103 R |
| 5,752,055 A * | 5/1998 | Redpath et al. | 715/515 |
| 5,835,712 A * | 11/1998 | DuFresne | 709/203 |
| 5,845,301 A * | 12/1998 | Rivette et al. | 715/512 |
| 5,859,974 A * | 1/1999 | McArdle et al. | 709/204 |
| 5,950,214 A * | 9/1999 | Rivette et al. | 715/512 |

OTHER PUBLICATIONS

Osterbye et al., An Interaction Engine for Rich Hypertexts, Sep. 1994, ECHT '04 Proceedings, ACM, pp. 167–176.*

Amann et al., Querying Typed Hypertext in Multicard/O2, Sep. 1994, ECHT '94 Proceedings, ACM, pp. 198–205.*

Davis et al., Light Hypermedia Link Services: A Study of Third Party Application Integration, Sep. 1994, ECHT '94 Proceedings, ACM, pp. 41–50.*

Zheng et al. Text Hypermedia Mutual Conversion and hypertext Interchange Through SGML, Mar. 1993, ACM, pp. 139–147.*

Zizi et al., Accessing Hyperdocuments throgh Interactive Dynamic Maps, Sep. 1994, ECHT '94, ACM, pp. 126–135.*

Davis et al. Microcosm: An open hypermedia system, May 1993, ACM, p. 526.*

(Continued)

*Primary Examiner*—Frantz Coby
(74) *Attorney, Agent, or Firm*—Lloyd W. Sadler

(57) ABSTRACT

A method for highlighting quoted passages in a hypertext system. When a quotation in a reference document is selected by the user of the hypertext system, the source document for that quotation is retrieved from storage. The passage corresponding to the quotation is then located in the source document, and that quoted passage is highlighted in the initial display of the source document. Searching can locate a quoted passage even though it differs from the quotation. Optionally, differences between the quotation in the reference document and the quoted passage in the source document can be highlighted.

18 Claims, 2 Drawing Sheets

OTHER PUBLICATIONS

Tompa et al., Hypertext by Link–Resolving Components, Hypertext '93proceedings, Jul. 1993, ACM, pp. 118–130*

Lawton et al., The Knowledge Weasel Hypermedia Annotation System, Hypertext '93 proceedings, ACM Nov. 1993, p. 106–117.*

Nanard et al., Should Anchors be Typed Too? An Experiment with MacWeb, Hypertext '93 Proceedings, ACM Nov. 1993 pp. 51–62.*

Davis et al., Towards An Integrated Information Environment With Open Hypermedia Systems, ACM 1992, pp. 181–190.*

Streitz et al., SEPIA: A Cooperative Hypermedia Authoring Environment, ACM 1992, pp. 11–22.*

Tiley et al., Personalized Information Structures, 1993 ACM, pp. 325–338.*

Smithe et al., ABC: A Hypermedia System for Articraft–Based Collaboration, Hypertext '91 Proceedings, ACM Dec. 1991, pp. 179–192.*

Tilley et al., INFO: A Simple Docuemnt Annotation Facility, ACM 1991, pp. 30–36.*

Creech et al., Using hypertext In Selecting Reusable Software Components, hypertext '91 proceedings, ACM Dec. 1991, pp. 25–38.*

Haake et al., Coexistence and Transformation of Informal and Formal Structures: Requirements for More Flexible hypermedia Systems, ECHT '94 proceedings, ACM Sep. 1994, pp. 1–12.*

Berlin, Where Did You Put it ? issues in the Design and Use of Group memory, INTERCHI '93, May 1993, ACM, pp. 23–30.*

Earlene Busch, "Search and Retrieval," Byte, Jun. 1992, pp. 271–276 L.R. Reynold et al., "Electronic Books," Byte, Jun. 1992, pp. 263–268 Jakob Nielson, "Hypertext and Hypermedia," Academic Press Inc., 1990, pp . 14–27 WordPerfect, version 6.0 DOS Reference, WordPerfect Corporation, 1992, pp. 689–701.

* cited by examiner

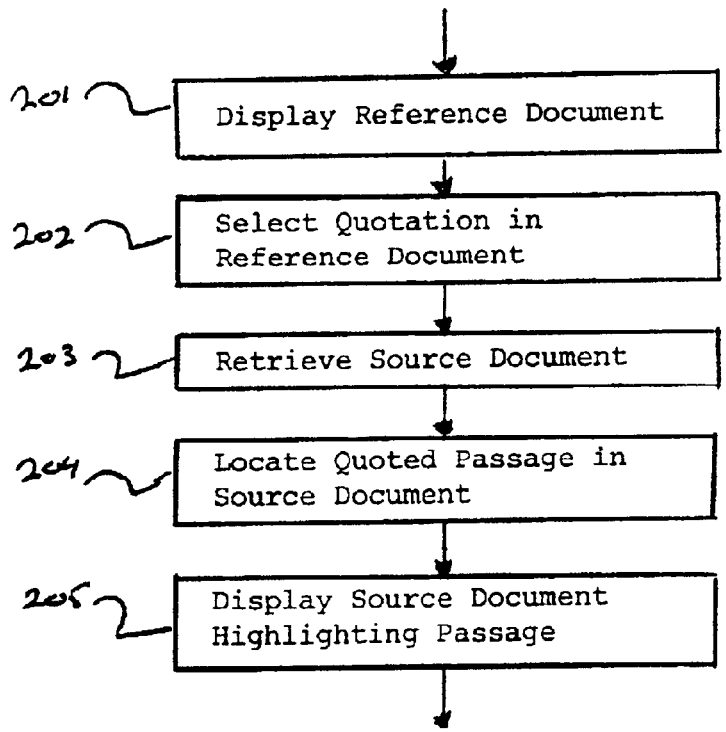
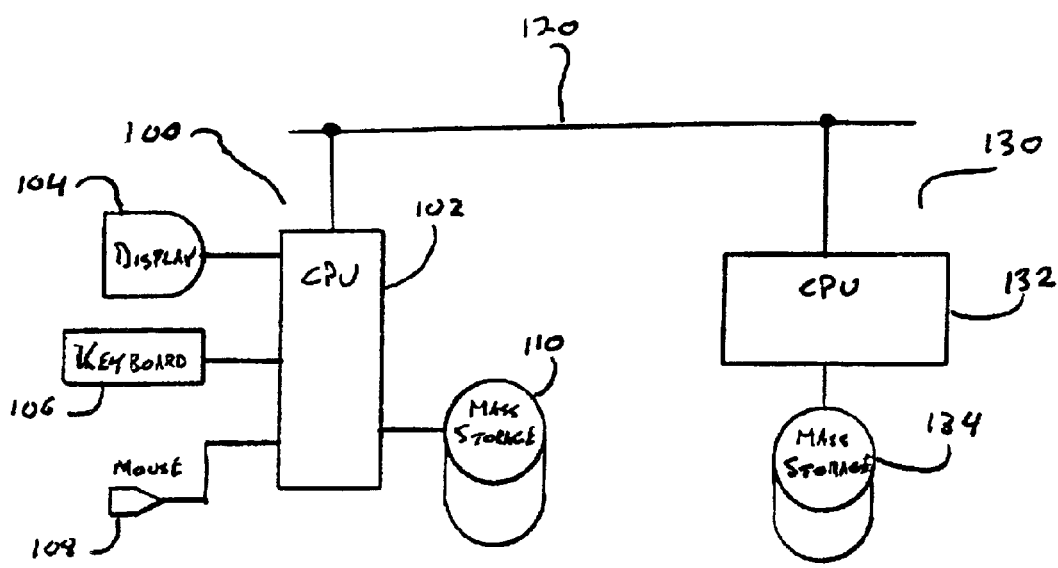

HIGHLIGHTING QUOTED PASSAGES IN A HYPERTEXT SYSTEM

CROSS REFERENCE TO RELATED APPLICATIONS

This application is a continuation-in-part of application Ser. No. 08/363,772, filed on Dec. 22, 1994 now abandoned.

FEDERAL RESEARCH STATEMENT

The U.S. Government has a paid-up license in this invention and the right in limited circumstances to require the patent owner to license others on reasonable terms as provided for by the terms of Grant MIP-9023174 awarded by the National Science Foundation.

BACKGROUND OF INVENTION

1. Field of the Invention

This invention relates to text display on a digital computer system, and in particular to the highlighting of information in a hypertext system.

2. Description of Related Art

A hypertext system, as that term is used in this specification, is a system for the display of text information grouped as documents. Within documents there are references, called links, to other documents or portions of the same document. Text associated with a link may be highlighted or displayed in a way that indicates that there is a link. When a link is selected, the document indicated by the link is displayed, either replacing the document containing the selected link or in another window. A link is generally selected by pointing at the text associated with the link (using a mouse, trackball, cursor keys, tab keys, or similar pointing means) and indicating the selection by a key or button press.

For example, in the court decision In re Alappat (Federal Circuit, 1994), there are a number of references to Diamond v. Diehr (Supreme Court, 1981). In a hypertext system whose documents are court decisions, the Alappat decision would contain links to the Diehr decision at the places where it is referenced. The reference to Diehr would be highlighted and when the reference is selected, the Diehr decision would be displayed.

Hypertext systems are well-known in the art. For a tutorial on hypertext systems, see "Hypertext: An Introduction and Survey" by Jeff Conklin (Computer, September 1987, pages 17–41). More references are described in Hypertext/Hypermedia: an annotated bibliography, compiled by Michael Knew and Steven D. Atkinson (ISBN: 0–313–27221-2, Greenwood Press, 1990). Many prior art hypertext systems also contain features beyond the definition of a hypertext system given above, such as the links to graphical or audio information as well as other documents.

The documents in a hypertext system may be stored on a mass storage device, such as a magnetic disk or CD-ROM, locally-attached to the computer system on which the documents are being displayed. The documents can also be stored on one or more networked document servers, where selection of a link results in a request being sent over the data communications network from the computer system on which the documents are being displayed to the networked document server holding the desired document, and that document being returned over the network for display. An example of the latter document storage method is the World Wide Web, a hypertext system where documents are stored on servers throughout the world.

SUMMARY OF INVENTION

In prior art hypertext systems, the selection of a document through a link generally causes the display of the beginning of that document. In other hypertext systems, a page number may optionally be included as part of a link. In that case, the document is displayed starting at that page number. In still other hypertext systems, a link may be associated with a label or tag within a document, and the document is displayed starting at the location of the label or tag.

In the present invention, a link may be associated not only with a reference to another document, but with the quotation of a passage from another document. When a link is associated with a quotation, the quotation is highlighted or displayed in a way that indicates that there is a link associated with the quotation. When the quotation is selected, using a mouse or some other means for selecting the quotation in the displayed text document, the source document containing the quoted passage is retrieved and displayed with the quoted passage highlighted. The first display of the source document may show the quoted passage and its immediate context.

In another embodiment of the present invention, the user can indicate a quotation by marking it, rather than have all quotations predesignated when a document is stored in a database.

Another feature of the present invention is to highlight the quoted passage in the source document such that any differences between the quotation in the document containing the reference and the passage in the source document are indicated. Such differences can include misspellings, inserted or deleted words, or changed words.

These and other features of the invention will be more readily understood upon consideration of the attached drawings and of the following detailed description of those drawings and the presently-preferred and other embodiments of the invention.

BRIEF DESCRIPTION OF DRAWINGS

FIG. 1 is a block diagram of a representative digital computer configuration on which the method of the invention can run.

FIG. 2 is a flow diagram showing the major steps of the method of the invention.

DETAILED DESCRIPTION

Figure 3:
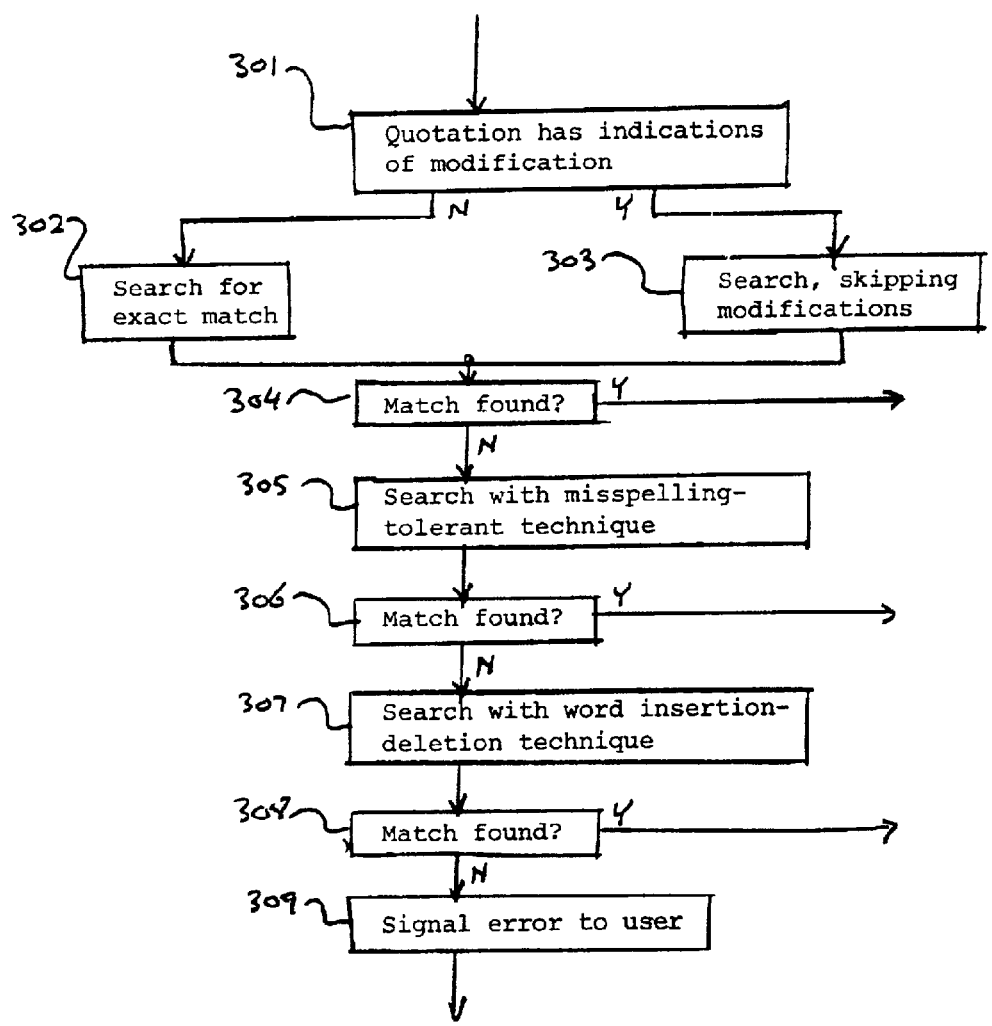
FIG. 3 is a flow diagram showing the major steps of the presently-preferred embodiment for locating a quoted passage in a source document.

Referring to FIG. 1, a representative digital computer configuration on which the method of the invention can run is illustrated. It is similar to the configuration needed to run a conventional hypertext system.

User computer system 100 includes central processor 102, display 104, keyboard 106, pointing device 108, and locally-attached mass storage device 110. Display 104 provides a means for displaying documents and will generally be a cathode ray tube (CRT) display or a flat-panel display, although any display device that can display text, highlighting portions of the displayed text, can be used with the invention. At least two distinct highlighting modes should be possible with display 104. Pointing device 108 can be a mouse, trackball, or other similar device. Locally-attached mass storage device 110 can be a magnetic disk, CD-ROM (compact disk read-only memory), or any other device capable of storing text documents.

Documents retrievable by the hypertext system can be stored on locally-attached mass storage device 110, or can be retrieved from document server 130 over data communications network 120. Document server 130 includes central processor 132 and mass storage device 134. Mass storage device 134 can be a magnetic disk, CD-ROM, or any other device capable of storing text documents. Document server 130 may have more than one mass storage device 134 attached, and there may be more than one document server 130 attached to network 120 and accessible to user computer system 100.

FIG. 2 shows a flow diagram indicating the major steps of the method of the invention. The method starts in step 201 with the displaying on display 104 of a reference document that has been retrieved from either locally-attached mass storage device 110 or networked document server 130. A reference document is a document that contains a quotation of a passage of a source document. The reference document can either occupy the full screen of display 104, or the screen of display 104 can be divided into windows and the reference document can occupy one of the windows.

A quotation of a passage from a source document means that that passage has been copied from the source document, or another document that itself quoted the source document, when the reference document was created. Such copying could be by copying the passage from the source document using a word processor and then pasting it into the reference document. Alternatively, the passage from the source document could be retyped as the reference document was being written. In either case, access to the source document, or another document quoting from the source document, during the creation of the reference document is necessary and the quotation represents a literal copying of a portion of the source document, the quoted passage. Something is not a quotation simply because it contains some words in common with another document.

In step 202, the user of the method selects a quotation in the displayed reference document. In the presently-preferred embodiment of the invention, quotations that can be selected by the user are highlighted in the display of the reference document. Possible ways of highlighting the quotation include the use of a different color from the rest of the text of the reference document, the use of a different font or character size or style, underlining the quotation, or any other display mode that differentiates the quotation from the rest of the reference document. Using a pointing device (like a mouse, trackball, or cursor movement keys) or similar means for selecting the highlighted quotation in the displayed reference document, the user selects a quotation by positioning to the quotation and pressing a button or key or other means of indicating a selection.

The predesignation of what portions of the reference document constitute quotations that should be highlighted and that the user can select can be performed either manually, as part of the preparation of the reference document for storing in a database for later retrieval, or automatically by a program that recognizes quotations by characteristic patterns in the reference document. A combination of manual and automatic predesignation of quotations is particularly effective. First, possible quotations are automatically recognized and then the reference document is manually reviewed to designate any quotations that were not recognized or to remove any recognized in error.

The particular technique for automatically recognizing quotations in a reference document depends on the format and style of the document. For example, a quotation may be recognized by being enclosed in quotation marks, being specially indented, being followed by a citation to the source document, or a combination of these signatures. Once the signatures are determined for a particular document format and system, the technique for automatically recognizing quotations will be readily apparent to one skilled in the art.

In another embodiment of the invention, the user can select a quotation by marking the quotation. Such marking can be done by positioning a cursor at the start of the quotation, indicating the quotation start by pressing a key or button, than positioning the cursor at the end of the quotation and indicating the end of the quotation by pressing a key or button. Alternatively, the quotation can be marked by positioning the cursor with a mouse or other pointing device at either the start or end of the quotation and then sweeping the cursor through the quotation while holding down a mouse button or key.

Having the user mark the quotation has the advantage of not requiring the predesignation of quotations within a reference document. However, it may lead to erroneous selection of a quotation, such as when a user includes words adjacent to the actual quotation in the marked portion, or marks a portion of the reference document that is not really a quotation. If predesignated quotations are used, as in the presently-preferred embodiment, all a user needs to do to select a quotation is position the cursor anywhere in the highlighted quotation using a mouse and click on the quotation.

After a quotation in the reference document has been selected by the user in step 202, step 203 retrieves the source document containing the passage containing the passage quoted in the selected quotation. The source document can be retrieved either from locally-attached mass storage device 110 or document server 130, depending on where the source document is stored.

In many cases, the quotation in the reference document will contain a citation, such as a case name or the volume and page numbers in one or more reporters or other document collections. If such a citation is present, the source document can be retrieved by determining the location of the document from the citation, such as looking it up in an index. In the presently-preferred embodiment of the invention, all quotations contain a citation, either as part of the quotation as it was originally in the reference document or added as part of the predesignation of quotations by the person performing the predesignation.

In the event there is no citation, or one cannot be determined in the marked portion of the reference document if that is how the user selected the quotation, then a search must be made of the databases storing documents for those containing the quotation. If more than one document contains the quotation, the user is asked to select one of the documents as the source document for the quotation. This method of retrieving documents is well-known in the field of text information retrieval, and any conventional information retrieval system can be used.

The quotation may differ from the actual passage in the source document, it may be desirable to first search the database for a key portion of the quotation (particularly a portion that does not indicated that it has been modified from the passage in the source document). When documents containing the key portion of the quotation have been located, they can be search using a more detailed search method, such as described below for locating the passage in the source document.

After the source document has been retrieved, step 204 locates the quoted passage in the source document corresponding to the quotation in the reference document. The details of how the quoted passage is located in the source documents will be discussed below.

In step 205, the source document is displayed with the quoted passage highlighted. Such highlighting can be by means of a color different from other colors used for other highlighting or for normally-displayed text in the source document. Underlining, the use of a different font or character style, or similar means of differentiating the highlighted text from other text can also be used.

In the presently-preferred embodiment, the source document is displayed in a second window that can be viewed simultaneously with the window displaying the reference document. This second window can be a completely new window on the screen or the result of splitting the existing window into two panes or subwindows. In other embodiments, the source document can replace the reference document in the reference document's original display.

It is possible that the quoted passage differs from the quotation in the reference document. For example, a word may be misspelled, words may be omitted or inserted, or words may be changed. When such word omission is intentional, it is often indicated by the use of ellipses such as " . . . " or "***", and when such word changes are intentional, they are often indicated by the changed words or characters being included in square brackets. In the presently-preferred embodiment, such differences are indicated when the passage is displayed by using at least two highlighting modes (such as colors, fonts, character styles, or underlining). One highlighting mode indicates the portions of the quoted passage that are the quotation and another highlighting mode indicates the portions of quoted passage that were omitted in the quotation, whether the omission was indicated by ellipses or not.

A portion of a passage is in a quotation if the portion is an exact substring of the quotation. A portion of a passage may also be in a quotation if the portion only differs from a substring of the quotation by a limited number of character insertions or deletions. This latter case allows the method to accommodate simple misspellings without indicating that the quotation differs from the quoted passage. In the presently-preferred embodiment, the user can select whether misspellings should be indicated or not. In normal use, misspellings would be ignored, but misspellings could be displayed for checking the accuracy of a quote.

Another feature available in the presently-preferred embodiment displays the words in the quotation that were changed from the passage in the source document. Such changes can be indicated in a different color or font, or by enclosing them in brackets, or differentiating them from the other displayed text in any other way.

For example, Judge Rader's concurrence in Alappat contains the following quotation: 'not nature's handiwork, but [the inventor's] own." Chakrabarty, 447 U.S. at 310. The source document, the Supreme Court's decision in Diamond v. Chakrabarty, can be determined by the citation that is part of the quotation. After it has been retrieved from a database of court decisions, the quoted passage can be located. In this case, the quoted passage differs from the quotation. The passage is really "not nature's handiwork, but his own;". It differs by "his" being replaced in the quotation by "the inventor's and by the ending punctuation.

If punctuation differences and spelling errors are disregarded in the display of the passage in the source document, the display of the source document might look like this: Here, by contrast, the patentee has produced a new bacterium with markedly different characteristics from any found in nature and one having the potential for significant utility. His discovery is not nature's handiwork, but his [the inventor's] own; accordingly it is patentable subject matter under s101.

The surrounding context for the quoted passage is displayed, the quotation is underlined, and the changed portion in the quotation is included in square brackets in the underlined text. The use of color in the presently-preferred embodiment further highlights the quotation and the changes.

The method of the invention allows for the viewing of the quoted passage in context, with any differences between the quoted passage and the quotation in the reference document readily apparent. This allows the user to determine the accuracy of the quotation and put it in the context of its original use.

Returning to step 204, locating the quoted passage in the source document, there are a number of ways this step can be implemented.

If the quotations have been predesignated when the reference document was stored in the database and if the source document has already been stored in the database when the quotation is predesignated, it is possible to associate a source document passage location indicator with the quotation. In other words, the location of the quoted passage within the source document can be determined when the quotation is being predesignated, and that location included with the quotation. Such a source document passage location indicator can identify not only the particular source document containing the quoted passage, but also the location in that document (for example, indicating the number of bytes into the source document to the start of the passage and the length of the passage).

There are two difficulties with using a source document passage location indicator. First, its use does not permit quotation marking by the user, since all quotations must be predesignated when the reference document is stored in the database in order to include their source document passage location indicators. Second, any changes to the source document, such as correcting a typographic error, which changes the number of bytes before the quoted passage or the quoted passage itself will result in an incorrect source document passage location indicator.

The alternative to using a source document passage location indicator is to search the source document for the quoted passage based on the quotation in the reference document. While outwardly like the search performed to see if a document in a text information retrieval system matches a query, this search has a number of differences.

First, the search is simplified because a particular document, the source document, and not an entire database of documents must be searched. This means that the search does not have to be particularly efficient in order to give satisfactory performance. Second, if the citation in the quotation is accurate, it is assured that there is a passage in the source document corresponding to the quotation in the reference document.

While a search for an exact match of the quotation could be used, such an exact-match search would not find the passage if there were any differences between the quotation and the quoted passage. Such differences could be because the passage has been intentionally modified in the quotation, such as omitting words (indicated by ellipses) or changing words (indicated by square brackets), or because there are spelling errors or the passage has been misquoted.

In the presently-preferred embodiment, a series of search techniques are used to locate a passage that approximately matches a quotation. There are a number of ways that a passage can approximately match a quotation. A passage approximately matches a quotation if it differs from the quotation because a limited number of characters are in the passage but not in the quotation, or a limited number of characters are in the quotation but not in the passage, or a limited number of characters differ between the quotation and the passage. A passage approximately matches a quotation if it differs because words are misspelled in the quotation, or if the punctuation of the passage differs from the quotation, or if they differ in typography. A passage approximately matches a quotation if a limited number of words from the passage are omitted in the quotation, or if a limited number of words have not present in the passage have been added to the quotation.

In essence, the approximate matching locates one or more passages in the source document that reasonably could be the passage being quoted in the reference document. If there are two or more passages that could be the source of the quotation, either all such passages could be displayed and highlighted, allowing the user to view each possibility, or the one that matches the quotation most closely could be displayed and highlighted.

Referring to FIG. 3, the flow diagram shows the major steps of the presently-preferred embodiment for locating a quoted passage in a source document, step 204 as discussed above.

In step 301, the quotation selected in the reference document is examined to see if it contains any indications that it has been intentionally modified from the passage in the source document. Such indications include the presence of ellipses (" . . . " or "***"), indicating an omitted portion of the passage, and square brackets ("[]"), indicating changes or substitutions of words or parts of words.

If there are no indications that the quotation has been intentionally modified, step 302 searches the source document for an exact match of the quotation.

Step 303 is used if there are indications of intentional modification in the quotation. A search technique is used that skips over the intentional modifications during the search of the source document. (In the presently-preferred embodiment, these modifications are later identified and highlighted when the source document is displayed.) First, a search is performed for the first unmodified portion in the quotation. When that is found, a search is performed for the next unmodified portion in the quotation, and so forth until all the unmodified portions in the quotation have been found.

For example, if the quotation were:[W]hen a claim containing a mathematical formula [, mathematical equation, mathematical algorithm, or the like,] implements or applies that formula [, equation, algorithm, or the like,] in a structure or process which, when considered as a whole, is performing a function which the patent laws were designed to protect (e.g., transforming or reducing an article to a different state or thing), then the claim satisfies the requirements of SA search for "hen a claim containing a mathematical formula" (the first unmodified portion in the quotation) would first be performed. Then a search for "implements or applies that formula"(the second unmodified portion of the quotation) would be performed. Finally a search for "in a structure or process which, when considered as a whole, is performing a function which the patent laws were designed to protect (e.g., transforming or reducing an article to a different state or thing), then the claim satisfies the requirements of section 101." (the last unmodified portion of the quotation) would be performed.

In the presently-preferred embodiment, the searches are designed to ignore typography within the quotation or the passage, such as the underlining in "as a whole", although such changes could be selected for highlighting when the source document is displayed.

Punctuation is also ignored in the presently-preferred embodiment's searches, since it is often changed without indication. Again, such changes can be highlighted when the source document is displayed.

In the presently-preferred embodiment, after all unmodified portions in the quotation have been found, a backwards search is performed starting just before the beginning of the portion of the quoted passage matching the final unmodified portion of the quotation for the unmodified portion of the quotation immediately preceding the final unmodified portion in the quotation. This backward search continues through all unmodified portions in the quotation until the first unmodified portion has been found. This backward search minimizes the lengths of the changed portions in the passage if an unmodified portion occurs multiple times in a passage.

For example, if a quotation were "computer . . . programmed" and the source document contained "We have held that such programming creates a new machine, because a general purpose computer in effect becomes a special purpose computer once it is programmed to perform particular functions pursuant to instructions from program software.", the backward search would indicate that the quoted passage was "computer once it is programmed" rather than "computer in effect becomes a special purpose computer once it is programmed".

The highlighting of a quoted passage in a source document using the techniques of the present invention is inherently dynamic. It is not a static highlighting determined at the time the source document is formatted for the hypertext system, as is the case for the highlighting of a hypertext link, but instead is based on the particular quotation selected by the user. If there are different quotations from the source document, the highlighting will be different depending on the particular quotation selected by the user.

For example, consider a source document consisting of the first subsection of 35 U.S.C. §103. If the quotation selected by the user were "the subject matter as a whole", then the underlined portion would be highlighted: A patent may not be obtained though the invention is not identically disclosed or described as set forth in section 102 of this title, if the differences between the subject matter sought to be patented and the prior art are such that the subject matter as a whole would have been obvious at the time the invention was made to a person having ordinary skill in the art to which said subject matter pertains.

If the selected quotation were "a person with ordinary skill in the art", then a different portion would be highlighted: A patent may not be obtained though the invention is not identically disclosed or described as set forth in section 102 of this title, if the differences between the subject matter sought to be patented and the prior art are such that the subject matter as a whole would have been obvious at the time the invention was made to a person having ordinary skill in the art to which said subject matter pertains.

Similarly, if the selected quotation were "obvious to a person skilled in the art", the highlighted display might look like: A patent may not be obtained though the invention is not identically disclosed or described as set forth in section 102 of this title, if the differences between the subject matter sought to be patented and the prior art are such that the subject matter as a whole would have been obvious at the time the invention was made to a person having ordinary skill[ed] in the art to which said subject matter pertains.

In this case, the highlighting indicated by underlining indicates the quotation selected by the user, and the portion in square brackets indicates a portion of the quotation that is not present in the quoted passage. In the presently-preferred embodiment, one color would be used to indicate the quotation selected by the user in the quoted passage and another color would indicate any differences between the quotation and the quoted passage, although the invention contemplates a variety of ways of indicating difference between quotations and quoted passages based on the capabilities of the users'' displays.

After either step 302 or step 303, a check is made in step 304 as to whether a match for the quotation has been found in the source document. If a match was found, control passes to step 205 of the method to display the source document.

If a match was not found, step 305 employs a more extensive, and therefore potentially slower, search technique. In particular, step 305 searches the source document using a misspelling-tolerant technique. It has been observed that most misspelled words have their first letter correct and that a very large proportion of misspelled words are single character errors. Furthermore, shorter words have few errors while longer words may contain more errors.

In the presently-preferred embodiment, the misspelling-tolerant technique used is to examine the source document word-by-word, rather than character-by-character, for matches. Within a word, there is a match if two words have the same first letter and differ only by a specified number of character insertions or deletions. The number of character insertions or deletions allowed is a function of the word's length, with short words allowing one or two insertions or deletions (two would be the case for a substituted character, which is regarded as an insertion and a deletion) and longer words allowing more insertions or deletions.

A search technique such as that of step 303, modified for word-by-word searching, is then used in step 305. This allows step 305 to function correctly if there are intentional modifications in the quotation. Step 306 checks to see if a match was found in step 305. If a match was found, control passes to step 205 of the method to display the source document.

If a match was not found, step 307 employs an even more extensive search technique. In the presently-preferred embodiment, the technique of step 307 not only includes the techniques of step 303 and step 305, but also is tolerant to word insertions and deletions.

In particular, when a mismatch between a word in the source document and a word in the quotation is found, the next word in the source document is examined to see if it matches. This continues until either a word match occurs or a threshold for allowable word deletions is reached. If the threshold for allowable word deletions is reached, the current word in the quotation is treated as a word insertion and is skipped, and the process begins again. If a threshold for allowable word insertions is reached, a match for the quotation is not found. If a match is found, step 308 passes control to step 205 of the method to display the source document.

This search technique tolerant to the insertion or deletion of words is similar to the search techniques employed in genetic sequence comparisons that find the closest DNA sequence to a particular DNA sequence within a long DNA sequence. Current techniques in sequence comparison can be readily adapted to this last search technique, possibly with the replacement of a character-by-character match with a word-by-word match that allows misspellings, as discussed above.

If a match is not found, either another, more comprehensive search technique can be employed or an error can be signaled to the user indicating that the quotation cannot be found in the indicated source document. The source document can also be displayed for the user to search, either visually or using an available search function in a text editor, for the quoted passage.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

For example, other digital computer system configurations can also be employed to perform the method of this invention, and to the extent that a particular system configuration is capable of performing the method of this invention, it is equivalent to the representative digital computer system of FIG. 1, and within the scope and spirit of this invention.

Once such digital computer systems are programmed to perform particular functions pursuant to instructions from program software that implements the method of this invention, they in effect become special-purpose computers particular to the method of this invention. The techniques necessary for this are well-known to those skilled in the art of computer systems.

Computer programs implementing the method of this invention will commonly be distributed to users on a distribution medium such as floppy disk or CD-ROM. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The term "computer-readable medium" encompasses distribution media, intermediate storage media, execution memory of a computer, or any other medium or device capable of storing for later reading by a computer a computer program implementing the method of this invention.

What is claimed is:

1. A method operating on a digital computer system, comprising:
    displaying a reference document containing a quotation of a passage from a source document to permit the selection of the quotation by a user; and then
    retrieving the source document containing the passage quoted in the quotation selected by the user; and then
    locating the quoted passage in the source document; and then
    displaying the source document, highlighting the quoted passage,
    where the highlighting of the quoted passage is based on the result of the locating step and not highlighting previously in the source document.

2. A digital computer system programmed to perform the method of claim 1.

3. A computer-readable medium storing a computer program implementing the method of claim 1.

4. A method as in claim 1, where the locating step utilizes an approximate matching technique to locate the quoted passage.

5. A digital computer system programmed to perform the method of claim 4.

6. A computer-readable medium storing a computer program implementing the method of claim 4.

7. A method operating on a digital computer system, comprising:
   - displaying a reference document containing a quotation of a passage from a source document to permit the selection of the quotation by a user; and then
   - retrieving the source document containing the passage quoted in the quotation selected by the user; and then
   - locating the quoted passage in the source document; and then displaying the source document, highlighting the quoted passage and indicating any differences between the quotation and the quoted passage,
   - where the highlighting of the quoted passage is based on the result of the locating step and not highlighting previously in the source document.

8. A digital computer system programmed to perform the method of claim 7.

9. A computer-readable medium storing a computer program implementing the method of claim 7.

10. A method as in claim 7, where the locating step utilizes an approximate matching technique to locate the quoted passage.

11. A digital computer system programmed to perform the method of claim 10.

12. A computer-readable medium storing a computer program implementing the method of claim 10.

13. A method operating on a digital computer system, comprising:
   - displaying a reference document containing a quotation of a passage from a source document to permit the selection of the quotation by a user; and then
   - retrieving the source document containing the passage quoted in the quotation selected by the user; and then
   - locating the quoted passage in the source document; and then
   - displaying the source document, highlighting the quoted passage and indicating any differences between the quotation and the quoted passage by using one highlighting mode to highlight portions of the quoted passage that are contained in the selected quotation, and using another highlighting mode to display portions of the quotation that are not in the quoted passage,
   - where the highlighting is based on the result of the locating step and not highlighting previously in the source document.

14. A digital computer system programmed to perform the method of claim 13.

15. A computer-readable medium storing a computer program implementing the method of claim 13.

16. A method as in claim 13, where the locating step utilizes an approximate matching technique to locate the quoted passage.

17. A digital computer system programmed to perform the method of claim 16.

18. A computer-readable medium storing a computer program implementing the method of claim 17.

* * * * *